(12) United States Patent
Van Den Enden et al.

(10) Patent No.: US 6,295,270 B1
(45) Date of Patent: Sep. 25, 2001

(54) OPTICAL RECORD CARRIER WITH GROOVES HAVING WOBBLES WITH PHASES DEPENDING ON POSITION INFORMATION PITS AT PREDETERMINED POSITIONS

(75) Inventors: Gijsbert J. Van Den Enden; Johannes H. M. Spruit; Johannes J. L. M. Van Vlerken; Ronald R. Drenten, all of Eindoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/268,255

(22) Filed: Mar. 15, 1999

(30) Foreign Application Priority Data

Mar. 16, 1998 (EP) .................................................. 98200824

(51) Int. Cl.$^7$ ........................................................ G11B 7/24
(52) U.S. Cl. ........................................ 369/275.4; 428/64.4
(58) Field of Search ............................... 369/275.4, 275.2, 369/275.3, 58; 428/64.1, 64.2, 64.4; 430/320, 321

(56) References Cited

U.S. PATENT DOCUMENTS 5,270,998 * 12/1993 Uchiumi ............................ 369/275.4
6,075,761 * 6/2000 Akiyama et al. ................. 369/275.4

FOREIGN PATENT DOCUMENTS 0 347 858 A2 * 12/1989 (EP) ................................. 369/275.4
0 800 165 A1 * 8/1997 (EP) ................................. 369/275.4

* cited by examiner

Primary Examiner—Tan Dinh
(74) Attorney, Agent, or Firm—Michael E. Belk

(57) ABSTRACT

An optical disk has tracks with a groove wobbled in a radial direction and addressing information at predetermined positions along the track. Embossed pits at the predetermined positions represent addressing information. The phase of the wobble near the predetermined positions depends on whether a pit is present on a predetermined position or not.

9 Claims, 3 Drawing Sheets

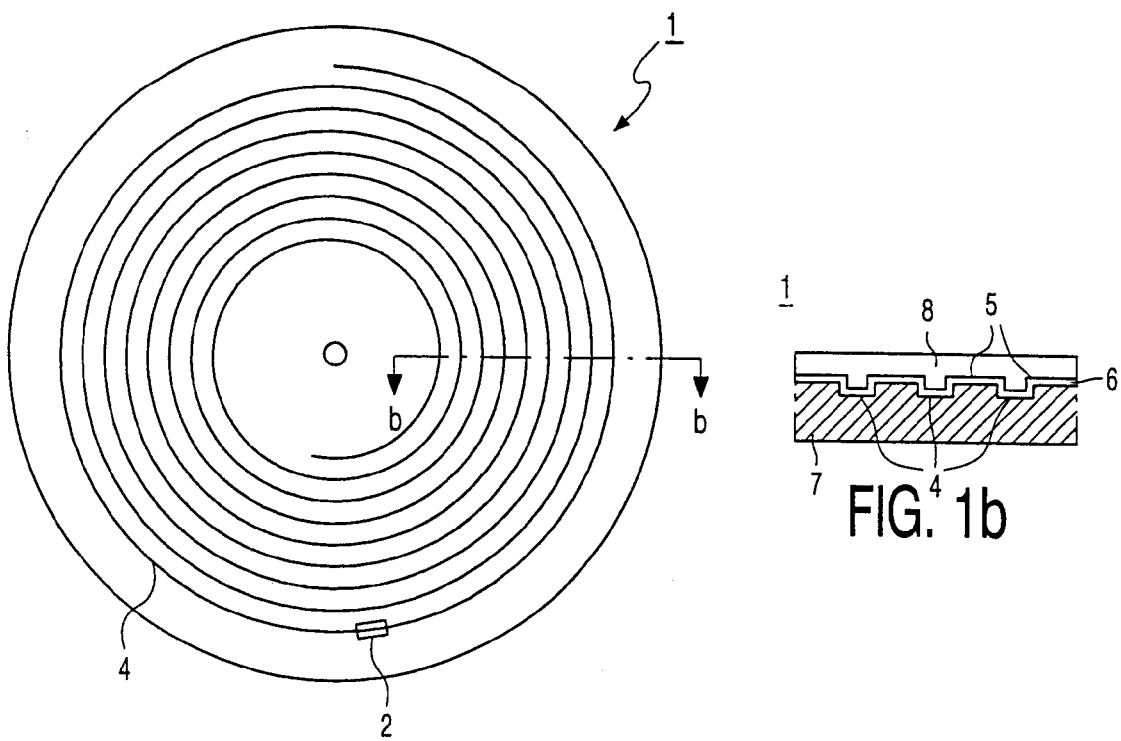
FIG. 1a
FIG. 1b
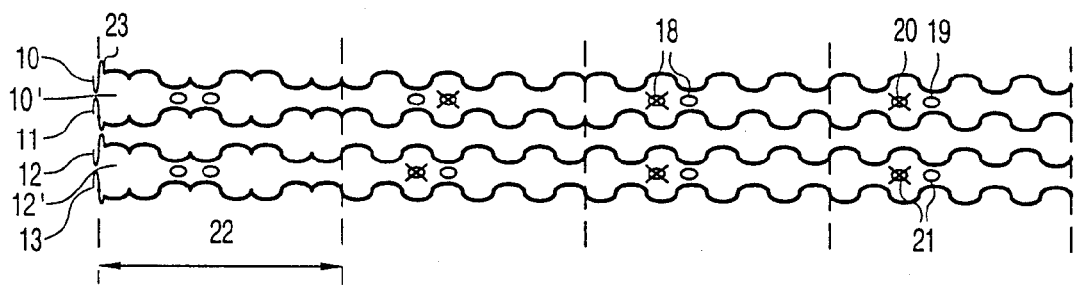
FIG. 2a
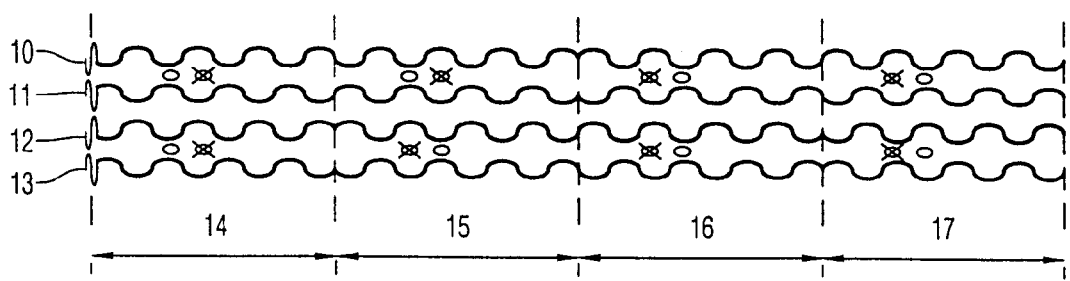
FIG. 2b

OPTICAL RECORD CARRIER WITH GROOVES HAVING WOBBLES WITH PHASES DEPENDING ON POSITION INFORMATION PITS AT PREDETERMINED POSITIONS

FIELD OF THE INVENTION

The invention relates to the field of record carriers with a recording layer having substantially parallel tracks for recording information in a pattern of optically detectable marks. The tracks are provided with wobbled grooves and predetermined positions along the tracks, on which positions information is stored in the form of pits. The invention also relates to a method for scanning such a record carrier and for an apparatus carrying out the method.

BACKGROUND OF THE INVENTION

When writing user information on a record carrier using a scanning radiation spot, it is in general desirable to know the position of the radiation spot on the record carrier. Since user information is not available on a virgin recordable record carrier, the position may be determined by reading position information stored in an embossed wobbled grooves or embossed pits of the record carrier.

In general, a track is a line on the record carrier to be followed by a scanning device and has a length of the order of a characteristic dimension of the record carrier. A track on a rectangular record carrier has a length substantially equal to the length or width of the record carrier. A track on a disc-shaped record carrier is a 360° turn of a continuous spiral line or a circular line on the disc.

A track may be a groove and/or a land portion between grooves. A groove is a trench-like feature in a land portion of the recording layer, the bottom of the trench being nearer to or further away from the light-incident side of the record carrier. User information may be recorded on the lands or in the grooves. The pits may be located on the lands or in the grooves.

A record carrier according to the preamble is known from European patent application no. 0 800 165, which discloses an optical record carrier having a groove radially wobbled at a constant frequency without phase jumps and pits formed at predetermined positions between turns of the wobbled groove. The pits are at positions where the wobble has a minimum or maximum deviation as measured from the centre of the pits. The inventors recognized that a of known record carriers is that the reliability of the detection of the pits reduces when user information is recorded in the tracks.

SUMMARY OF THE INVENTION

It is an object of the invention to provide a record carrier having a pit-groove structure which can be detected more reliably.

In accordance with the invention, in the record carrier as described in the opening paragraph, the phase of the wobble at the predetermined positions is adapted to the presence of a pit at such a predetermined position. The wobble of the groove can enhance the signal obtained from the pits when scanning the record carrier. According to the invention, the phase of the wobble at a certain position along the track must be adapted to the presence or absence of a pit at such a position. The detection margin of the pits can be substantially increased when the phase has a first value at a predetermined position where there is a pit and a second, different value at a predetermined position where there is no pit. The increased detection margin allows a reduction of the size of the pits, thereby reducing crosstalk from the pits on the signal representing user information recorded in the tracks.

Preferably, the wobble has a minimum value, as measured from the centre line connecting the pits along a track, at a predetermined position with pit and a maximum value at a predetermined position without pit. When the pits are located on a land portion between two neighbouring grooves, the two grooves are preferably in anti-phase. When the pits are depressions in the land and the grooves are trench-like, the predetermined positions with pits are preferably located at positions where the land has a minimum width and the predetermined positions without pits are preferably located at positions where the land has a maximum width.

The predetermined positions may be arranged at equidistant positions along a track. They may also be grouped in series and the wobble in between subsequent series of predetermined positions in the track direction represents preferably, information. When the information in the wobble is encoded by phase-shift keying, the same phase variation of the wobble may be used for parts of the groove at the position of the predetermined positions and for parts of the groove in between the series of predetermined positions.

The predetermined positions are preferably, grouped in doublets of two neighbouring predetermined positions, and only one pit is present in each doublet. A single logical value may be assigned to a doublet, e.g. a pit followed by a non-pit is a '1' and a non-pit followed by a pit is a '0'. When the presence of a pit at both positions in a doublet is determined, the detection margin between a '1' and a '0' is increased compared to a detection at a single position.

In a record carrier wherein land portions are arranged between neighbouring grooves, the land portions are preferably, alternatingly provided with pits and without pits. When scanning a groove, there are pits on only one side of the groove, thereby reducing cross talk between neighbouring tracks.

An apparatus according to the invention, scans an optical record carrier having substantially parallel tracks for recording user information in a pattern of optically detectable marks. The tracks are provided with wobbled grooves and predetermined positions along the tracks, on which information is stored in the form of pits. The apparatus includes an optical system for scanning tracks by a radiation beam, a detector for detecting a radiation beam coming from the record carrier, and a first signal processor for deriving information represented by the pits from an output signal of the detector. The apparatus is provided with a second signal processor for deriving information represented by the wobble from an output signal of the detector, and a selector for forming an information signal from an information output signal of the first signal processor and an information output signal of the second signal processor.

A method according to the invention scans an optical record carrier having substantially parallel tracks for recording user information in a pattern of optically detectable marks. The tracks are provided with wobbled grooves and predetermined positions along the tracks, on which information is stored in the form of pits. During scanning an information signal is derived from one of the pits, the wobble, and the pits and the wobble, depending on selection criteria.

The objects, advantages and features of the invention will be apparent from the following more particular description of preferred embodiments of the invention, as illustrated in the accompanying drawings, in which;

BRIEF DESCRIPTIONS OF THE DRAWING

FIG. 1a and 1b show embodiments of a record carrier according to the invention,

FIG. 2a and 2b show enlarged sections of four neighbouring tracks on the record carrier.

DETAILED DESCRIPTION OF THE PREFERRED EMBODIMENT

Figure 3:
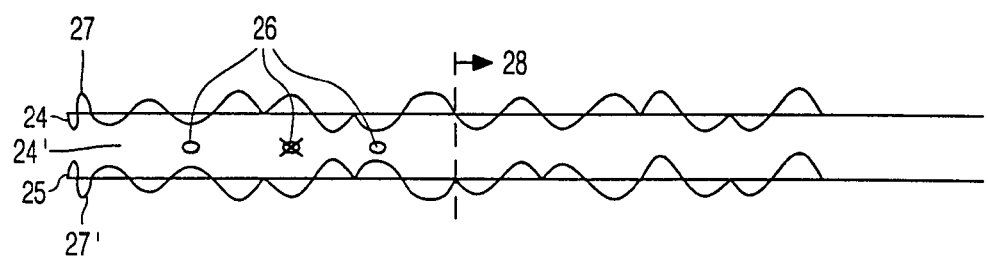
FIG. 3 shows a bit cell of a record carrier according to the invention.

FIG. 1 shows an embodiment of a record carrier 1 according to the invention, FIG. 1a being a plan view and FIG. 1b showing a small part in a sectional view taken along the line b—b. The record carrier 1 has a series of tracks, each forming a 360° turn of a spiral line, of which some eight are shown in the Figure. A track is constituted, for example, by a preformed groove 4 or ridge 5 or a combination of a groove and a ridge. The tracks are intended for positioning a radiation beam on the tracks. For the purpose of recording information the record carrier 1 has a recording layer 6, which is deposited on a transparent substrate 7 and which is covered by a protective coating 8. The tracks are scanned by a radiation beam entering the record carrier through substrate 7. The recording layer is made of a radiation-sensitive material which, if exposed to suitable radiation, is subjected to an optically detectable change. Such a layer may be, for example, a thin layer of material such as tellurium, which changes reflection upon heating by a radiation beam. Alternatively, the layer may consist of magneto-optic or phase-change materials, which change direction of magnetization or crystalline structure, respectively, upon heating. Examples of phase change materials are compounds containing tellurium such as AgInSbTe or GeSbTe. When the tracks are scanned by a radiation beam the intensity of which is modulated in conformity with the information to be recorded, an information pattern of optically detectable marks is obtained, which pattern is representative of the information. In a non-recordable, read-only record carrier the layer 6 may be a reflective layer, for example made from a metal such as aluminum or silver. The information in such a record carrier is prerecorded in the record carrier during its manufacture, for example in the form of embossed pits.

The groove period in a radial direction of the record carrier is 0.74 µm, the widths of the land portion 5 and of the groove 4 being equal. The depth of the groove is 50 nm. The record carrier is suitable for being scanned by a radiation beam having a wavelength between 635 and 650 nm.

FIGS. 2a and 2b show an enlarged plan view of two sections of four neighbouring tracks. The disc-shaped record carrier of this embodiment is divided into 16 segments, thereby dividing each track into 16 consecutive segments of equal angular extent. Each segment of a track is divided in 16 sequences. FIG. 2a shows the first sequence of four neighbouring tracks 10, 11, 12 and 13. FIG. 2b shows the layout of each of the second to the sixteenth sequence of the tracks 10, 11, 12 and 13. Each sequence contains four consecutive bit cells 14, 15, 16, 17.

The groove of a track is indicated by thick undulating line and the area between two neighbouring lines is the land portion between grooves. The width of the land portions in FIGS. 2a and 2b is exaggerated with respect to the width of the grooves for reasons of clarity. User information is written in the grooves by a radiation beam which is guided along the centre line of the groove.

Each bit cell has predetermined positions at which a pit may be present. The predetermined positions are on the land portions and are indicated by circles 18. A predetermined position with a pit is indicated by an open circle 19, a predetermined position without a pit is indicated by a crossed circle 20. The pits in the Figure are only on the land portion 10' between tracks 10 and 11 and land portion 12' between tracks 12 and 13. The grooves have a radial wobble with a 20 to 30 nm peak-to-peak deviation. The depth of the pits is substantially the same as that of the grooves, i.e. 50 nm in this embodiment. The width of the pits may be smaller than the width of the land portion at the position of the pit. However, the width may also be equal to that of the land portion, thereby forming a connection between the two grooves on both sides of the land portion. The positions are grouped in doublets 21 of two neighbouring positions. A bit cell comprises four 360° periods of the wobble. The predetermined positions of the doublet in the embodiment shown are at 90°±10° and 270°±10° of the second period of the wobble in a bit cell.

A track in a segment contains 16 sequences of four bit cells each, making a total of 64 bit cells per segment. The first bit cell 22 of a segment contains a synchronisation bit, characterized by a doublet having two pits. Each of the 63 subsequent bit cells contains a doublet having a single pit and representing a logical value of a data bit. A 'pit'—'non pit' doublet represents a logical '1', a 'non pit'—'pit' doublet represents a logical '0'. The sequence of 63 values in the bit cells represent address information, such as the layer number in a multi-layer record carrier, track number, segment number and error-correction data.

Each track has comprises a so-called clock mark 23, i.e. a relatively fast modulation of the groove, at the start of a sequence. A clock mark in the even-numbered track 10 changes from a zero deviation to a minimum deviation, to a maximum deviation and back to a zero deviation. The deviation is the distance of the centre-line of the groove to the centre line of the land portion on which the predetermined positions are located. A clock mark in the odd-numbered tracks 11 changes from a zero deviation to a minimum deviation, to a maximum deviation and back to a zero deviation. The clock marks may be used for synchronisation purposes. The polarity of a clock mark may be used to determine whether the track being scanned is an even-numbered track or an odd-numbered track.

The phase of the wobble of the groove is such that the deviation of the groove has a maximum value at a predetermined position 20 without pit and a minimum value at a predetermined position 19 with a pit. In the embodiment shown in FIG. 2 this applies to the grooves on both sides of the predetermined positions. Hence, the wobble of the even grooves 10, 12 is in anti-phase with the wobble of the odd grooves 11, 13. The wobble of this embodiment has no phase jumps in bits cells containing a data bit. The wobble has several 180° phase jumps in the bit cell containing a synchronisation bit. The phase of the wobble depends on the logical value represented by the bit cell. This allows a scanning device to read the information stored in the bit cells not only from the modulation of the radiation beam from the record carrier generated by the pits but also from the modulation generated by the phase of the wobble. When the radiation beam follows groove 10, the information stored in the pits on land portion 10' can be derived from the so-called push-pull signal. The same information can be obtained when scanning groove 11. The scanning device can determine whether it scan an even groove 11 or an odd groove 10 from the phase of the clock marks 23 or from the phase of the groove wobble in the first segment 22. The information stored in the pits on a land portion is common to the two grooves on both sides of the land portion.

FIG. 3 shows the groove-pit structure of bit cell in an alternative embodiment of a record carrier according to the invention. A land portion 24' contains series of three equidistant predetermined locations 26. The middle position of the triplet shown in the Figure does not have a pit, the outer two positions have a pit. The presence and absence of pits in consecutive triplets can represent addressing information. Two grooves 24 and 25 on both sides of the land portion each have a clock mark 26, 27 for synchronisation purposes. The information stored in the land portion 24' is common for the grooves 24 and 25. The land portions on the other sides of the grooves are not provided with pits. The wobbles of the two grooves are in anti-phase near the predetermined positions 26 to have a minimum deviation near a pit and a maximum deviation near a predetermined position without a pit. In the part 28 of the bit cell following the triplet the wobbles of the two grooves are modulated independently and represent different information, specific for each groove. A logical '1' is coded as one period of a sinusoidal wobble, a logical '0' is coded as one period of a 180° phase-shifted sinusoidal wobble.

In another embodiment each land portion is associated with one groove and each land is provided with predetermined positions. The phase of the groove wobble is related to the presence of a pit at the predetermined locations in the associated land portion.

The invention is not limited to the wobble patterns shown in the Figures. The pattern may have two or more complete sinewaves instead of one. The average value of the deviation of each pattern or of a series of patterns is preferably equal to zero in order to avoid offsets in the radial tracking of the radiation beam. The pattern may includes sections with zero deviation in order to avoid sharp transitions in the deviation. Instead of the sinusoidal pattern, other patterns may be used, such as a triangular pattern or a sinc-function pattern.

Figure 4:
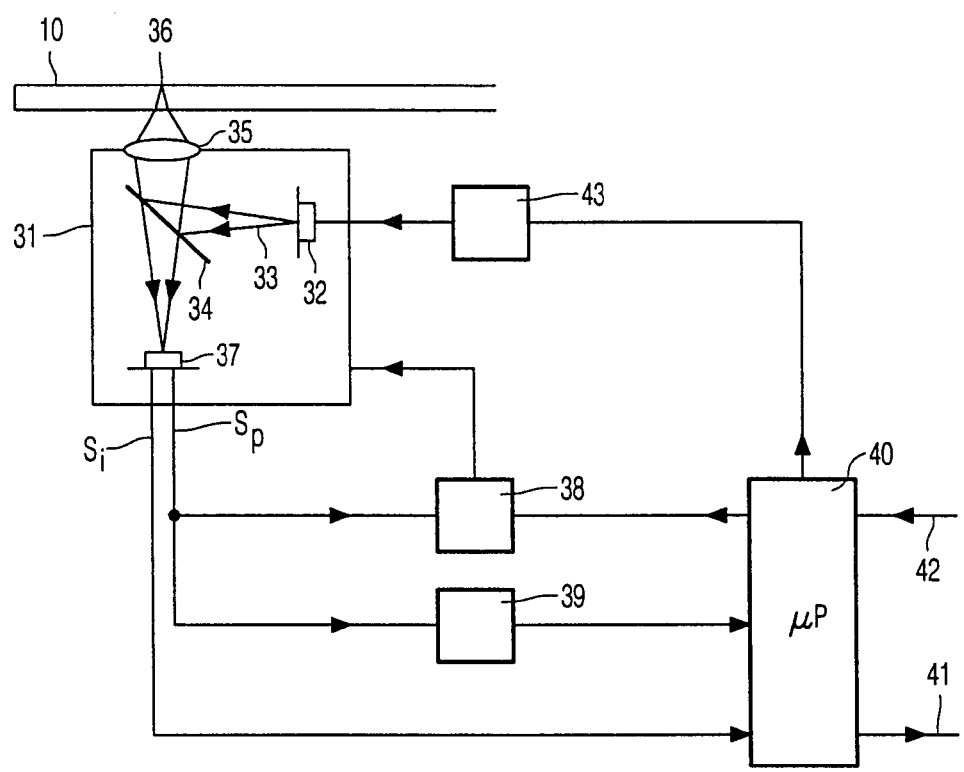
FIG. 4 shows a scanning device according to the invention.

FIG. 4 shows an apparatus for scanning a record carrier as shown in FIG. 1. The apparatus includes an optical system 31 for optically scanning tracks in record carrier 10. Optical system 31 includes a radiation source 32, for example a semiconductor laser. Radiation source 32 emits a radiation beam 33, which is reflected by a beam splitter 34 and converged by an objective lens 35 to a radiation spot 36 on the tracks in an information layer of record carrier 10. Radiation reflected from the record carrier is guided to a detector through objective lens 35 and beam splitter 34 to a detector 37. The detector is a split-detector having a dividing line between the two halves of the detector running parallel to the direction of the tracks being scanned. The sum signal of the two halves, usually called the central aperture signal, represents the information recorded in the tracks and is output as signal $S_i$. The difference signal of the two halves, usually called the push-pull signal, represents position information and servo information recorded in the tracks, and is output as signal $S_p$. The low-frequency content of the signal $S_p$ represents the servo information, indicating the position of the radiation spot 36 with respect to the centre-line of the track being scanned. The signal $S_p$ is used as input for a servo circuit 38, possibly after a low-pass filter which passes the servo information but blocks the position information. The servo circuit controls the position of the radiation spot in a direction perpendicular to the direction of the track by controlling the position of optical system 31 and/or the position of objective lens 35 within the optical system.

Figure 6:
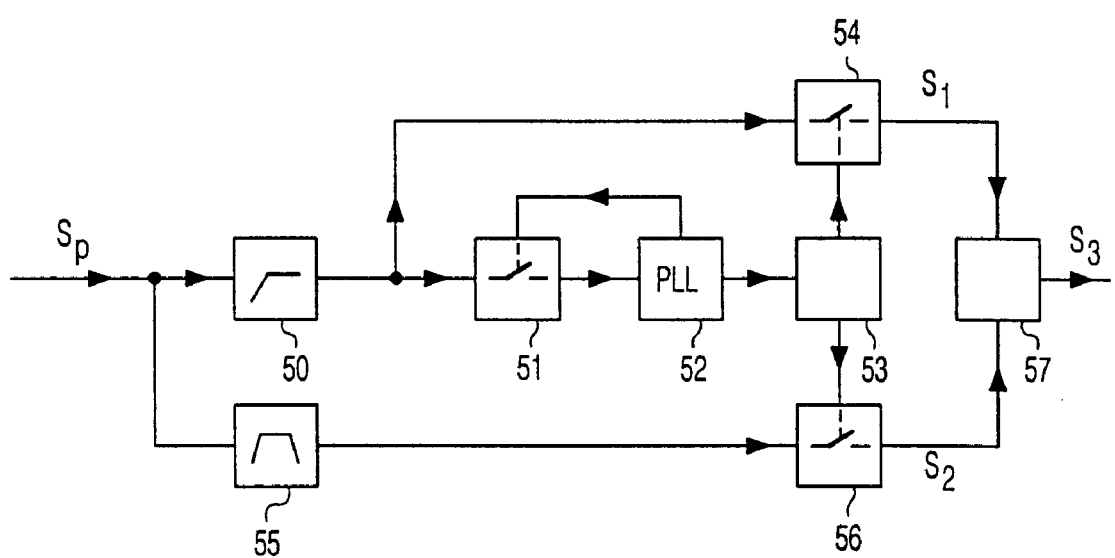
FIG. 6 shows a signal processor for deriving position information from a detector signal.

The signal $S_p$ is also fed into a signal processor 39, which extracts the position information from the signal $S_p$. The position-information signal output from signal processor 39 is fed into a micro-processor 40, as shown in FIG. 6. The micro-processor can derive, for example, the current position of radiation spot 36 on record carrier 10 from the position-information signal. During reading, erasing or writing, the micro-processor can compare the current position with a desired position and determine the parameters for a jump of the optical system to the required position. The parameters for the jump are fed into servo circuit 38. The information signal $S_i$ is fed into the micro-processor, enabling it to derive for instance directory information from the signal, which may be used for controlling the position of the radiation spot. The information signal is provided as output signal 41 of micro-processor 40.

When writing user information on a record carrier having prerecorded servo tracks containing position information, the user information to be recorded is fed into micro-processor 40 by a signal 42. The scanning device reads the position information from the servo tracks. Micro-processor 40 synchronizes the information to be written with the position information and generates a control signal which is connected to a source control unit 43. Source control unit 43 controls the optical power of the radiation beam emitted by radiation source 32, thereby controlling the formation of marks in record carrier 10. The synchronisation may involve the imposition of a fixed relation between the synchronisation patterns in the position information and synchronisation patterns present in the user information signal to be recorded.

Figure 5:
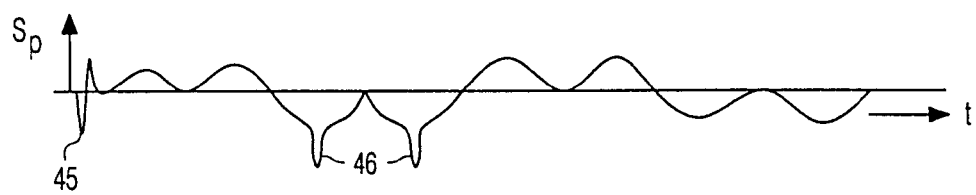
FIG. 5 shows a signal modulated by pits and groove wobble.

FIG. 5 shows part of the push-pull signal $S_p$ as a function of time t during the period the radiation beam scans bit cell 22 of track 10 in FIG. 2a. The clock marks 23 shows up as a feature 45 having relatively high-frequency components. The two pits in the bit cell show up as two peaks 46 on the wobbled signal. The peaks increase the signal level of the wobble at the position of the peaks, thereby increasing the detection margin.

FIG. 6 shows an embodiment of the signal processor 39 for extracting position information from the push-pull signal $S_p$. The signal $S_p$ is connected to a high-pass filter 50 that passes signal components related to the clock marks and pits but blocks those related to the servo information and the wobble. The high-pass filtered signal is passed to a sampler 51, having a switch which closes during a short time interval around the expected position of each clock mark. The output of the sampler is connected to a phase-locked loop (PLL) 52, that stabilizes a clock by means of the clock marks. The PLL sets the period during which sampler 51 passes the clock marks, thereby avoiding interference from other high-frequency components in the signal $S_p$, such as from the pits. The frequency of the clock is sufficiently high to set accurately the sample moments for deriving the information from $S_p$. The clock signal of the PLL is connected to a control circuit 53, which generates trigger signals for samplers.

The filtered signal formed by high-pass filter 50 is connected to a sampler 54 controlled by a first trigger signal from control circuit 53. The first trigger signal closes the switch of the sampler only at the predetermined positions along the track currently being scanned. Since the predetermined positions are related to the positions of the clock marks, control circuit 53 can generate the first trigger signal from the clock of the PLL, which is based on the clock marks. The output of sampler 54 is a first information output signal $S_1$ contain the information represented by the pits.

Signal $S_p$ is connected to a band-pass filter 55 that passes signal components in a band centred on the frequency of the groove wobble. The band-pass filtered signal is connected to a sampler 56 controlled by a second trigger signal from control circuit 53. The second trigger signal closes the switch of sampler 56 at positions along the track currently being scanned where the wobble reaches an extreme position. The output of sampler 56 is a second information output signal $S_2$ containing the information represented by the groove wobble.

Elements 50 to 54 can be regarded as a first signal processor for deriving information represented by the pits from $S_p$, whereas elements 50 to 53, 55 and 56 can be regarded as a second signal processor for deriving information represented by the wobble from $S_p$. The information signals $S_1$ and $S_2$ of the two signal processors are fed into selector means 57, which forms an information signal $S_3$ from $S_1$, $S_2$ or a combination of $S_1$ and $S_2$. Since the phase of the wobble corresponds to the presence of pits at the predetermined positions along a track, the information stored in the pits is in general identical to the information stored in the wobble near the predetermined positions. The choice between signals $S_1$ and $S_2$ may be determined by the quality of the signals, which the scanning device may establish by means of an error-correction/detection circuit operating on the information and an error-correcting/detecting code embedded in the information. The choice may also be determined by the status of the record carrier. Since the quality of the $S_1$ is generally good for unwritten record carriers, selection means 57 may form information signal $S_3$ from the 'pit' signal $S_1$ when scanning an unwritten record carrier and from the 'wobble' signal $S_2$ when scanning a written record carrier. Selector means 57 may form information signal $S_3$ as a combination of signals $S_1$ and $S_2$, by using signal $S_1$ for the information represented by the pits and signals $S_2$ for the information stored in the wobble of the bit cells outside the predetermined positions along the track.

Signal $S_3$ may be processed in order to extract synchronization signals from the information and to assign logical values to doublets or triplets as described above. The pits and/or wobble represent preferably addressing information for the record carrier. Information signal $S_3$ may then be used as input to micro-processor 40 for controlling the position of the radiation beam on the record carrier.

Signal processor 39 may include a phase detector for determining the phase of the clock marks 23. The phase may be used to determine whether the track currently being scanned is an even or an odd track.

What is claimed is:

1. An optical record carrier comprising:

a substrate;

a recording layer having substantially parallel tracks for recording information in a pattern of optically detectable marks;

wobbled grooves along the tracks;

pits for storing position information at predetermined positions along the tracks, the wobble being discontinuous so that the phase of the wobble at the predetermined positions depends on the presence of a pit at such a predetermined position.

2. An optical record carrier, comprising:

a substrate;

a recording layer having substantially parallel tracks for recording information in a pattern of optically detectable marks;

wobbled grooves along the tracks;

pits for storing position information at predetermined positions along the tracks, the phase of the wobble at the predetermined positions depends on the presence of a pit at such a predetermined position;

and wherein the wobble has a minimum value at a predetermined position with pit and a maximum value at a predetermined position without pit.

3. The record carrier of claim 1, wherein the predetermined positions are grouped in series and the wobble in between the series of predetermined positions in the track direction represents information.

4. The record carrier of claim 3, wherein the position information in the wobble is encoded by phase-shift keying.

5. The record carrier of claim 1, wherein the predetermined positions are arranged between neighboring grooves.

6. The record carrier of claim 5, wherein the phase of the wobble of only one of the neighboring grooves depends on the presence of a pit at a predetermined position.

7. An optical record carrier, comprising:

a substrate;

a recording layer having substantially parallel tracks for recording information in a pattern of optically detectable marks;

wobbled grooves along the tracks;

pits for storing position information at predetermined positions along the tracks, the phase of the wobble at the predetermined positions depends on the presence of a pit at such a predetermined position;

and wherein the phases of both neighboring grooves depend on the presence of a pit at a predetermined position and the wobble of both neighboring grooves is in anti-phase.

8. The record carrier of claim 1, wherein the predetermined positions are grouped in doublets of two neighboring predetermined positions, and one pit is present in each doublet.

9. The record carrier of claim 1, wherein land portions are arranged between neighboring grooves, and land portions are alternatingly provided with pits and without pits.

* * * * *